United States Patent [19]

Takimoto et al.

[11] 3,954,467

[45] May 4, 1976

[54] ELECTROPHOTOGRAPHIC PHOTOSENSITIVE MATERIAL

[75] Inventors: Masaaki Takimoto; Satoru Honjo; Yasuo Tamai, all of Asaka, Japan

[73] Assignee: Fuji Photo Film Co., Ltd., Minami-ashigara, Japan

[22] Filed: Oct. 29, 1971

[21] Appl. No.: 194,038

[30] Foreign Application Priority Data

Oct. 31, 1970 Japan.............................. 45-96221

[52] U.S. Cl......................................... 96/1.7; 96/1 R; 96/1.5; 96/1.6; 96/1.8; 427/16
[51] Int. Cl.$^2$........................................ G03G 5/08
[58] Field of Search .................. 96/1, 1.5, 1.8, 1.6, 96/1.7; 117/37 LX, 17.5 LE

[56] References Cited
UNITED STATES PATENTS 3,025,160   3/1962   Bunge et al.............................. 96/1
3,403,019   9/1968   Stahly et al............................. 96/1.5

*Primary Examiner*—Roland E. Martin, Jr.
*Attorney, Agent, or Firm*—Gerald J. Ferguson, Jr.; Joseph J. Baker

[57] ABSTRACT

An electrophotographic photosensitive material having an electrophotosensitive layer comprising a finely divided inorganic photoconductive material, a sensitizing dye for the photoconductive material and a resinous binder on a support and to be subjected to bleaching treatment after the formation of a visible image to remove the coloration with the sensitizing dye from the electrophotosensitive layer with a solution containing an organic acid or an alkali metal hydroxide, which comprises the resinous binder being crosslinked with polyisocyanate to be rendered insoluble in an organic solvent.

5 Claims, No Drawings

ELECTROPHOTOGRAPHIC PHOTOSENSITIVE MATERIAL

This invention relates to an electrophotographic photosensitive material adapted for use in electrophotographic process utilizing dye-sensitized photoconductive layer, and particularly to an electrophotographic photosensitive material comprising a photoconductive layer capable of sufficiently enduring the bleaching treatment when said layer is subjected to a bleaching treatment after the formation of image thereon.

In electrophotographic processes a photoconductive layer provided on an electroconductive support is electrostatically charged uniformly in a dark place and then subjected to imagewise exposure by light image to obtain on said photoconductive layer an electrostatic pattern corresponding to said light image, and said electrostatic pattern is visualized by depositing thereon fine toner particles provided with suitable electrostatic charge. The visible image thus obtained can be fixed directly on said photoconductive layer or can be transferred onto other suitable sheet material.

In case of direct fixing of the obtained toner image on the photoconductive layer, it is naturally desirable that the recording material comprising said photoconductive layer is flexible and said photoconductive layer is as pale colored as possible. However, a light sensitive material with low light absorption is naturally associated with very low or almost no light sensitivity and contradicts with the requirement for high light sensitivity (particularly in connection with the light spectrum of the readily available light sources.).

Consequently, it becomes necessary to sensitize an originally white photoconductive layer with sensitizing dye when a particularly high sensitivity is required or in case of mono- or multi-color reproduction of multi-color original image. However, elevated whiteness of background is an extremely strong requirement in the quality of finished reproduction, and consequently it becomes necessary to bleach the dye-sensitized photoconductive layer after the development thereof when an electrophotographic photosensitive sheet is used instead of conventional silver halide photographic paper.

Such bleaching of photosensitive layer is usually realized by dissolving out the dye contained therein. An example of such processes is disclosed in U.S. Pat. No. 3,250,614 in which the dye is dissolved out by immersing the photosensitive layer in solution of organic acid such as oxalic acid or maleic acid. Another example is disclosed in Jap. Pat. appln. No. 60617/69 of the present inventors in which an alkali metal hydroxide solution is utilized. In both cases the photosensitive layer is supposed to be composed of white or pale photosensitive material such as zinc oxide or titanium oxide and resinous binder, and the dye is mostly adsorbed on the surface of photoconductive particles which are surrounded by said resinous binder. Thus, in order that the chemical reagent such as acid or alkali can promptly reach said surface, it is indispensable to employ a solvent capable of dissolving or swelling said binder.

When said binder is composed of a thermoplastic resin, the composition of bleaching bath is easily determinable since such resin is soluble in suitable solvents. However, in this case, a rapid processing for example on an automatic device is not realizable since the photosensitive layer softened with solvent renders the succeeding operations difficult.

On the other hand the operation is much more facilitated if the binder is already hardened, and the photosensitive layer and toner image thereon is hardly damaged for example by passing the recording material between a pair of squeeze rollers directly after the bleaching treatment to remove the excessive bleaching liquid.

Such hardened resin is obtainable by using a hardenable resin and a suitable hardening catalyst or cross linking agent. Such resins are represented by unsaturated resins such as alkyd resin, epoxyester resin, etc., which are hardenable with heavy metal catalyst. Such hardening (cross linking) accelerators are unpractical, however, because such substances accelerate oxidation reaction and therefore decompose the sensitizing dyes at the same time.

The object of this invention is to provide a novel electrophotographic photosensitive material which can be bleached without the above-mentioned drawbacks. Another object of this invention is to provide an electrophotographic photosensitive material provided with a photoconductive layer capable of enduring rapid processing and adapted for automatic processing on an automatic device.

The present inventors have found that the above-mentioned objects can be most advantageously fulfilled by cross linking with polyisocyanate of resin provided with radicals capable of reacting therewith, and also that the combination of said materials with photoconductive materials such as zinc oxide or titanium oxide, etc. provides excellent electrophotographic properties. Besides this hardening process does not involve a treatment at elevated temperature and does not cause the decomposition of sensitizing dye.

More specifically this invention is to provide an electrophotographic photosensitive material comprising an electrophotographic photosensitive layer containing inorganic photoconductive powdered material, sensitizing dyes therefor and resinous binder, said photosensitive layer being subjected to bleaching treatment to remove coloration due to the presence of said sensitizing dyes after the formation of image on said layer, which comprises said resinous binder which is to be treated with a bleaching solution containing organic acid or alkali metal hydroxide being composed of a resin which becomes insoluble in organic solvents when cross linked with polyisocyanates.

Each component constituting the photosensitive material according to this invention will be discussed in the following:

a. Inorganic photoconductive material such as zinc oxide and sensitizing dyes to be used therewith It is already known that zinc oxide prepared by French process is most suitable for electrophotographic processes, but other photoconductive materials can also be added in limited amounts in order to regulate the property of tone reproduction. Such photoconductive materials can for example be titanium oxide, cadmium sulfide, zinc sulfide, etc. As regards titanium oxide preferred is rutile type.

Sensitizing dyes for photoconductive zinc oxide are already disclosed in various patents and references.

In case of color sensitization for the purpose of obtaining multi-color reproduction from a multi-color original pattern, the photoconductive material is required to have light sensitivity almost throughout the visible wavelength range. The sensitivity almost throughout the visible wavelength range used herein shall mean the sensitivity in the wavelength range sufficient and necessary for multi-color reproduction, and such requirement can be fulfilled by providing one sensitivity peak in each of the wavelength range of 400 – 460 mμ, 450 –570 mμ and 550 – 750 mμ. In order to have a convenient subdued light, it is also possible to make the sensitivity of certain wavelength range extremely low, as in the case of conventional silver halide color photographic paper. The optimum spectral sensitivity is to be determined by the color characteristics of average originals, but it is commonly accepted to have said sensitivity peaks in the wavelength regions of 430 – 440 mμ 520 – 540 mμ and 650 – 700 mμ, respectively. In addition said peaks are preferred to be as sharp as possible, and for this purpose it is also possible to utilize dye coagulate (J-band absorption) which is already known in the field of silver halide photography. The sensitizing dyes utilizable in this invention are, for example, cyanines, hemicyanines, melocyanines, hemioxonoles, xanthenes, sulfophthaleins, triphenylmethanes, etc. The amount of sensitizing dyes is variable depending on the purpose of use of photosensitive material and the processing method thereof, but in case of this invention this will not pose any serious problem at the bleaching step so long as said amount is confined to 0.02 parts per 100 parts of zinc oxide. When the imagewise exposure is carried out through a color negative or positive original in combination with a color separation filter, a photosensitive layer of higher sensitivity is required due to considerable decrease of light intensity because of filter characteristics.

In case of blow-up of high magnification on a material of high sensitivity, it is often required to have a further higher sensitivity of approximately 5 times. For simple sensitivity increase not aiming for multi-color reproduction, dye-sensitization can be realized to increase the sensitivity in a suitable wavelength range in consideration of the light source and safelight to be employed.

Besides zinc oxide, titanium oxide is already known as also pale-colored photoconductor, but this material is to be sensitized with basic dyes and therefore is different in behaviour from zinc oxide.

b. Resinous binder

The resin preferred in this invention is alkyd resin having hydroxyl radical capable of reacting with isocyanate radical, epoxy esters of fatty acids of dehydrated castor oil or vinyl polymer containing hydroxyl radicals (mainly composed of methacryl esters, acryl esters or styrene), which are cross linked with isocyanate compound.

As regards alkyd resin almost any type can be utilized in this invention such as that denatured with drying oil, non-drying oil, styrene, acrylic compounds, phenol resin or rosin, etc.

It is important in that case that the acid component contains an aromatic nucleus since aliphatic polyesters are not suitable for practical purposes because of high moisture-dependence of electric resistance. Said aromatic acid is preferred to be phthalic acid of isophthalic acid, to occupy 10 to 50 percent of the total weight of resin and further to be provided with hydroxyl value of 10 to 100. As regards epoxy esters, the preferred materials are the derivatives of fatty acids of dehydrated castor oil. Photosensitive layer employing such materials is already disclosed detailedly for example in British Pat. No. 1,237,036.

Also particularly preferable as the resinous binder are the compound mainly composed of acryl esters or methacryl ester copolymerized with hydroxyethyl acrylate, hydroxyethylmethacrylate, allyl alcohol, hydroxyethylacrylamide, or more generally with monomer represented by the following general formula:

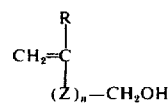

wherein
R: H or CH$_3$
Z: —COOCH$_2$—, —CONHCH$_2$— or —OCH$_2$—
n: 1 or 0

The compounds of this group permit wider range of formulation, and can also be copolymerized with acrylonitrile, styrene, etc.

Certain compounds of this group are commercially available, such as Aron S-2001 and S-2002 manufactured by Toa Gosei Chemical Kogyo Co., Ltd.

Resins of particularly high acid value should be prevented since the cross linking reaction is retarded in acidic atmosphere when this reaction is conducted with isocyanates. More specifically preferred particularly is the resin with acid value lower than 25.

The composition solely consisting of vinyl copolymer and polyisocyanate may show certain drawbacks such as insufficient affinity to inorganic powdered material such as zinc oxide, strong thixotropic behavior in coating composition or unsatisfactory dark decay characteristics when the dispersion is insufficient. Such drawbacks can be prevented by adding alkyd resin as explained before in an amount of 2–40 percent with respect to the total amount of binder composition (including polyisocyanate). Also it is possible to increase further the alkyd resin to reach a composition where the vinyl copolymer is a miner component. Such composition is already disclosed in detail for example in Japanese Pat. application No. 2589/70.

Polyisocyanate compound to be employed in this invention is preferred to be provided with low volatility at room temperature and is represented by a condensation product of 1 mole of trimethylol propane and 3 moles of tolylene diisocyanate. Commercial products such as Desmodur-L of Bayer A.G., Colonate L of Nippon Polyurethane Kogyo Co., Ltd. or Takenate of Takeda Chemical Industries, Ltd. are available.

Also a condensation product of 1 mole of trimethylol propane and 3 moles of xylylene diisocyanate is preferable because of stability against light.

Naturally aliphatic polyisocyanates are also utilizable. Such polyisocyanate compounds are reactive with alkyd resin or epoxy esters at low temperature, and therefore does not induce the destruction of sensitizing dyes or support material such as paper because the treatment at elevated temperature is not required. Said polyisocyanate compound is preferably added in 1.2 to 10 times, more preferably in 2 to 9 times, of the amount chemically corresponding to hydroxyl radicals contained in the resin employed.

When the amount of polyisocyanate is almost equivalent to that of hydroxyl radicals, the decay of electrostatic charge on photosensitive layer is sometimes found to be accelerated in liquid developer. Such phenomenon is observed when the dissolving power of carrier liquid is high, and can be prevented by employing isoparaffinic hydrocarbons as carrier liquid. In case of reproducing an image using liquid developer containing liquid of higher dissolving power, it generally becomes necessary to use large amount of isocyanates. For example, in case of alkyd resin denatured with styrene(hydroxyl value 50), the dark decay characteristics in purified kerosene or decaline becomes equal to those in air only when isocyanate is employed in at least 2 times the stoichiometric amount. With less amount, the decay in liquid becomes quicker even if the behavior in air is satisfactory. Naturally it becomes possible to add isocyanate in 1.2 to 2 times the stoichiometric amount of liquid developer of very fast developing speed or, namely, with elevated toner concentration.

In liquid developing process, sufficiently slow decay is indispensable for the reproduction of continuous tone, because the development proceeds, irrespective of presence or absence of development electrode, preferentially from the area provided with stronger electrostatic field. For example when a wide area with uniform electrostatic charge density is present in the center of surrounding area where the charge density is almost zero, the development starts from the periphery of said charged area and proceeds to the inner side thereof since the strongest electrostatic field results in said inner portion because of neutralization of peripheral charge as the result of development. The development of a wide uniform area proceeds in such fashion, and loss of charge during the development will therefore result in an image with intensified edge effect.

Furthermore, in case of repulsive development, the development is carried out with the toner provided with electrostatic charge of the same sign as that of the latent image while a bias potential is applied to the developing electrode so as just to cancel the electrostatic field in the areas which are provided with highest charge density in the latent image and where the developed image density should be zero.

In this case if the charge decay is relatively quick in the liquid developer, the optimum bias potential varies as the function of time and should therefore be changed accordingly. This factor requires complicated mechanisms which are accompanied by various practical problems. On the other hand if the decay in liquid developer is slower, such complication becomes unnecessary and the range of potential variation becomes less if required.

Another advantage of the photosensitive material according to this invention is very soft tone reproducing characteristics. This fact can be ascertained by the development using liquid developer containing toner of particle size of less than 1 micron, preferably 0.1 to 0.5 microns.

When exposure is made through a photographic optical wedge onto and electrostatically charged photosensitive material, the average gamma $\bar{\gamma}$ of the characteristic curve becomes 1.5 – 2.0 or even higher in case of hardened electrophotographic photosensitive material according to the conventional techniques. On the other hand this value becomes to ca. 0.7 – 1.8 in the photosensitive material according to this invention, and, besides, the maximum density becomes approximately 2 presumably also due to the slow charge decay in liquid developer.

The value of gamma is determined according to the knowledge common in the field of photographic paper. Namely, the developed characteristics of optical wedge are plotted by the reflective density in ordinate and the logarithm of exposure in the abscissa. In this case the length of abscissa corresponding to the change of exposure of 10 times is made equal to the length of the ordinate corresponding to the density change of 1.0, and this length is referred to as the unit length. Then two parallel straight lines distant each other by 1/10 of said unit length are drawn to frank said plotted characteristic curve, and the inclination said parallel lines is defined as the average gamma $\bar{\gamma}$.

The amount of binder is usually chosen between 5 and 50 parts with respect to 100 parts of inorganic photoconductive powdered material. However, it is also possible to obtain a highly insulative layer even with an amount of 1 – 0.5 parts by employing a special layer forming method.

c. Bleaching of sensitizing dye

As explained in U.S. Pat. No. 3,250,614, the photosensitive layer can be bleached for example by:

I. immersing the photosensitive layer in a liquid which is a solvent for the binder employed and which accelerates the desorption of the sensitizing dye;

II. immersing the photosensitive layer in a solvent for the binder, said solvent containing substances capable of accelerating the desorption of sensitizing dye of changing said dye to colorless substance;

III. immersing the photosensitive layer in a solvent for the binder, said solvent containing oxidizing agent capable of oxidizing the sensitizing dye into a colorless substance.

The binder employed in this invention is insoluble in most solvents because of cross linked structure thereof. Consequently above methods are applied in this case by using liquid capable of suitably swelling the binder. In consideration of evaporating speed, toxicity or danger to human body, inflammability, etc., examples of preferred swelling agent (or penetrating agent to the photosensitive layer) are as follows:

ketones such as acetone, methylethyl ketone or methylisobutyl ketone; aromatic hydrocarbons such as tetrahydrofurane, dioxane, toluene, xylene or cymene; esters such as methyl acetate, ethyl acetate, propyl acetate, butyl acetate or amyl acetate; alcohols (which are simultaneously capable of dissolving sensitizing dye) such as methyl alcohol, ethyl alcohol, propyl alcohol, butyl alcohol, ethylene glycol or monomethyl ether; hydrocarbons such as heptane, hexane or mineral spirit; or halogenated hydrocarbons such as methylchloroform, trichlorofluoromethane, tetrachloromethane, tetrachloroethane or trichloroethylene. The above-listed compounds are disclosed in the patent cited above. Among the cited substances particularly effective are organic acid because of rapid effect thereof.

On the other hand alkali such as sodium hydroxide or potassium hydroxide is also effective as the bleaching agent as already disclosed detailedly in German Offenlegungsschrift No. 2038207. This process is provided with certain advantages such as of being effective against the J-coagulate of cyanine dyes or of keeping intact the toner containing organic pigments unstable against acids.

The bleaching process is characterized by treating the colored electrophotographic photosensitive layer consisting of zinc oxide and resinous binder and containing sensitizing dye with a solution containing (I) solvent for said sensitizing dye and (II) alkali hydroxide, and eventually (III) organic solvent capable of slightly swelling said resinous binder and (IV) cationic surface active agent thereby changing said photosensitive layer to substantially white, and then washing said photosensitive layer with washing liquid consisting of the above-mentioned (I) and/or (III) or said washing liquid further containing suitable acid.

As explained above the essential components in the bleaching solution to the employed in this invention are the above-mentioned (I) and (II), and the components (III) and (IV) are to be added according to the purpose.

The component (I) of the above-mentioned bleaching solution can be composed of solvent such as methyl alcohol, ethyl alcohol, isopropyl alcohol acetoner, water, ethylene glycol or monomethylether. Also the component (II) can be composed for example of potassium hydroxide, sodium hydroxide or lithium hydroxide, and the component (III) can be composed of the swelling agent explained above. The component (IV) can be, for example, Nissan Cation M2-100 manufactured by Nissan Chemical Co., Ltd.

Particular attention should be paid to the effect of water, and it is preferred to maintain the water content below a certain value for certain pigment since the presence of water may enhance the effect of alkali hydroxide (II) to the photosensitive layer and various pigments and may accelerate the bleaching of certain lake pigments. For this purpose it is effective to a material which is insoluble in the bleaching solution and absorbs water (such as Molecular Sieve A produced by Linde Corp., U.S.A. silica gel, almina gel etc.). The presence of such material in the bleaching solutions is also effective against the incorporation of condensed water into the solution resulting from the evaporation of volatile components.

Generally speaking the water content should preferably less than 10 percent of the weight of bleaching solution when lake pigments are contained in the toner.

The component (I) works simultaneously as the solvent for alkali hydroxide, and generally occupies 30 – 80 percent by weight of the bleaching solution. Among the compound listed for the component (I), methyl alcohol and ethyl alcohol are almost incapable of swelling the resinous binder, and acetone alone works also as the component (III) as explained before, however, when the binder is composed of polyvinyl acetate which is easily soluble in methanol, methanol naturally works as the component (III) and should therefore be added in reduced amount.

The most prominent characteristic of the present process lies in the use of alkali hydroxide (II), which exhibits improved bleaching ability, several times larger than that or organic acids against certain sensitizing dyes. It is also clarified, as explained above, that the component (III) increases the bleaching ability. Furthermore, the bleaching solution according to this invention has wider applications than acidic bleaching solutions because of larger bleaching speed and because the toner image containing lake pigments is kept intact.

The component (I), which is added to dissolve the sensitizing dye contained in the photosensitive layer, is preferred in most cases to contain small amount of acetone, presumably because the presence of acetone is not only effective for dissolving the dye but also as the component (III), namely for accelerating the bleaching reaction. In case of determining the components (I) and (III), sufficient attention should be paid so as that these components do not give undesirable effect to the photosensitive material as well as the image thereon. The bleaching treatment can also be carried out at an elevated temperature when a rapid processing is required, but particular attention is necessary in this case because the effect of the component (III) is intensified at higher temperature.

Though the resin component in the toner image and the solubility thereof in the bleaching solution have not been discussed, the mechanical strength of the toner image is surely lowered if the bleaching solution is capable of dissolving the resin component in the toner. This drawback can be prevented by employing strongly polar composition (for example chiefly composed of methanol, ethanol, acetone etc.) for the bleaching solution and using a resin component insoluble therein for the toner. Although it seems generally accepted that most resins are soluble in acetone, some resins employable in liquid developer are actually hardly soluble in acetone such as certain phenolformaldehyde resins denatured with rosin, phenolformaldehyde resin denatured with linseed oil, styrene butadiene copolymer or other styrenic copolymers, polyisobutylene, polybutene, etc. When the bleaching solution is mainly composed of alcohols, the selecting range of resin component is further widened to pose no practical difficulties.

As regards the component (II) explained before, potassium hydroxide and then sodium hydroxide are most suitable in consideration of the solubility in organic solvent.

The concentration of alkali hydroxide in the bleaching solution is in the range of 0.01 – 20 wt. percent, more preferably 0.1 – 1 wt. percent. The bleaching solution containing alkali hydroxide at a high concentration is utilized for rapid processing.

Also, the addition of cationic surface active agent (IV) to the bleaching solution is also effective for electrophotographic photosensitive layer containing certain dyes.

After bleaching treatment, the photosensitive layer is preferably rinsed with a liquid composed of the component (I) and/or (III) or said liquid further containing suitable acid. Sufficient rinsing assures the stability of photosensitive layer and image, but more preferably is rinsing treatment with diluted acid solution. The use of acid is undesirable for certain lake pigments, but this step for neutralizing slightly remaining alkali can be realized, different from bleaching treatment, by a highly diluted acid solution. Thus, rinsing can be realized by this method even if pigments unstable against acid are present.

EXAMPLE 1

White suspension was prepared from 100 g of photoconductive zinc oxide, 12 g of styrenated alkyd resin (Styresol 4400: Japan Reichhold), 8 g of polyisocyanate (Desmodur-L; Bayer A.G.) as hardening agent and 80 g. of n-butyl acetate, to which added was a solution containing each 1 mg of fluorescein, rose bengal and brilliant blue FCF in 5 ml of methanol. After sufficient agitation, the obtained mixture was coated on a subcoated paper sheet so as to obtain a coating thickness of 10 microns after drying. After drying the coating was kept at 50°C. for 12 hours to harden the binding resin. A bleaching solution consisting of:

| | |
|---|---|
| methyl alcohol | 30 ml |
| ethyl alcohol | 30 ml |
| acetone | 30 ml |
| n-butyl acetate | 10 ml |
| potassium hydroxide | 1.0 g | was prepared, and the effect of bleaching was measured using the electrophotographic photosensitive layer free from image thereon. The color of the photosensitive layer before bleaching was x: 0.301, y: 0.311 and Y: 0.718 on the C.I.E. chart. After bleaching treatment at 25°C for 30 seconds and succeeding rinsing with methyl alcohol, the sample showed improvement in hue and brightness, reaching the indexes of x: 0.304, y: 0.315 and Y: 0.839.

Also a photosensitive layer holding a multicolored image thereon consisting of three toners respectively containing benzidine yellow GR, brilliant carmine 6B and phthalocyanine blue was treated with the above-mentioned bleaching solution at 25°C for 30 seconds to obtain the finished print with increased whiteness without the deterioration of the image itself.

By squeezing of the photosensitive sheet with squeezing rollers realized rapid drying without any damage to the photosensitive layer and to the image thereon.

EXAMPLE 2

A bleaching solution of the following composition:

| | |
|---|---|
| ethyl alcohol | 20 ml |
| methyl alcohol | 20 ml |
| water | 5 ml |
| n-butyl acetate | 5 ml |
| sodium hydroxide | 0.5 g | was prepared, and the photosensitive layer described in Example 1 was treated at 25°C for 60 seconds. After rinsing with methyl alcohol, the color indexes reached x: 0.302, y: 0.314 and Y: 0.798.

When similar bleaching treatment was carried out with the above-mentioned bleaching solution further containing 0.1 g of cationic surface active agent (Nissan Cation M2-100; Nissan Chemical Co., Ltd.) the color indexes reached x: 0.301, y: 0.311 and Y: 0.777.

EXAMPLE 3

The process of example 1 was repeated except that potassium hydroxide was replaced by oxalic acid. The photosensitive layer after treatment showed color indexes of x: 0.295, y: 0.314 and Y: 0.808.

EXAMPLE 4

A mixture of 100 g of photoconductive zinc oxide, 8.5 g of copolymer consisting of styrene, n-butyl methacrylate, 2-hydroxyethyl acrylate and acrylic acid in the proportion of 33 : 49 : 16 : 2 in mole and 3.5 g of alkyd resin modified with styrene (hydroxyl value 50) were blended with suitable amount of butyl acetate in a homogenizer to obtain homogeneous dispersion. Then 0.020 g of fluorescein, 0.015 g of rose bengal and 0.025 g of bromo chlorophenol blue dissolved in 10 ml of methanol was added in thus obtained dispersion. Finally Takenate D-110N manufactured by Takeda Chemical Industries, Ltd. was added as polyisocyanate component so as that 4 g of non-volatile component are contained in the mixture, and the obtained dispersion was coated on a paper previously subjected to electroconductive treatment with potassium polyvinyl benzene-sulfonate so as to obtain a coating thickness of 7 microns after drying.

The bleaching solutions in Examples 1 and 3 were used on thus obtained coated paper to give similarly satisfactory results.

EXAMPLES 5 AND 6

100 g of photoconductive zinc oxide, 10 g of copolymer consisting of styrene, n-butyl methacrylate and 2-hydroxyethyl methacrylate in the proportion of 35 : 50 : 15 in mole and 1 g of alkyd resin modified with phenol were added in the mixture of toluene and ethyl acetate to obtain homogeneous coating composition. Methanol solution of sensitizing dyes was then added similarly as in Example 1, and polyisocyanate (Colonate L; Japan Polyurethane Kogyo) was added so as that 3 parts of non-volatile material was incorporated into the mixture. The mixture thus obtained was coated on an electroconductive paper to obtain photosensitive layer.

The photosensitive layer after drying was separately treated for 1 minute with the following two bleaching solutions to obtain excellent results similar to Example 1:

| Bleaching solution (a) | |
|---|---|
| methyl alcohol | 50 ml |
| acetone | 50 ml |
| sodium hydroxide | 0.1 g |
| potassium hydroxide | 0.4 g |
| Bleaching solution (b) | |
| methyl alcohol | 50 ml |
| acetone | 50 ml |
| maleic acid | 2 g |

EXAMPLES 7 AND 8

100 g of photoconductive zinc oxide, 9 g of styrenated alkyd resin (Styresol 4250; Japan Reichhold) and 80 g of n-butyl acetate were kneaded in a porcelain ball mill for 4 hours. To white dispersion thus formed, 6 g of 50 wt. percent ethyl acetate solution of polyisocyanate (Colonate L : Nippon Polyurethane Kogyo), 10 g of methanol containing 0.04 g of anhydro-3,3'-di-$\beta$-carboxyethyl-5,5'-dimethoxy-9-ethylthia-carbocyanine hydroxide and 2.5 g of water were added and a mixture was stirred with a homogenizer. As stirring original magenta color of the mixture due to absorption of light at 575 m$\mu$ turned bluish. The mixture was then applied to an electroconductive paper shown in Example 4 to produce a photosensitive layer. The layer showed three absorption peaks at 540, 575 and 650 m$\mu$. The absorption peak of 650 m$\mu$ was very sharp and was attributed to the formation of J-aggregates. Reflectances were 70% at 540 m$\mu$, 56% at 575 m$\mu$ and 27% at 650 m$\mu$ while that of a photosensitive layer without the dye was about 90 percent. The photosensitive layer was separately treated with the following two bleaching solutions for 30, 60 and 120 seconds.

| Bleaching solution (C) | |
|---|---|
| methyl alcohol | 50 ml |
| acetone | 50 ml |
| potassium hydroxide | 1 g |
| Bleaching solution (D) | |
| methyl alcohol | 50 ml |
| acetone | 50 ml |
| oxalic acid | 1 g |

After washing with methanol and drying, the reflectances of the photosensitive layer were determined. The results are shown in the following table:

| Treating Time | Bleaching Solution (C) | | | Bleached With Bleaching Solution (D) | | |
|---|---|---|---|---|---|---|
| | 540 mμ | 575 mμ | 650 mμ | 540 mμ | 575 mμ | 650 mμ |
| 0 | 70 % | 56 % | 27 % | 70 % | 56 % | 27 % |
| 30 | 90 % | 90 % | 90 % | 73 % | 65 % | 41 % |
| 60 | 90 % | 90 % | 90 % | 74 % | 65 % | 50 % |
| 120 | 90 % | 90 % | 90 % | 83 % | 78 % | 77 % |

From the table it will be understood that bleaching solutions of our invention are effective to removing J-aggregates of cyanine dye and that bleaching solutions containing an alkali metal hydroxide are especially superior.

What is claimed is:

1. An electrophotographic photosensitive material having an electrophotosensitive layer comprising a finely-divided inorganic photoconductive material, a sensitizing dye for said photoconductive material and a resinous binder having an acid component with an aromatic nucleus on a support which comprises said resinous binder being crosslinked with polyisocyanate to be rendered insoluble in an organic solvent.

2. An electrophotographic photosensitive material as claimed in claim 1, wherein said resinous binder comprising a alkyd resin having hydroxy radical capable of reacting with isocyanate radical.

3. An electrophotographic photosensitive material as claimed in claim 1 wherein said resinous binder comprising an epoxy ester of fatty acid of dehydrated castor oil.

4. An electrophotographic photosensitive material as claimed in claim 1, wherein said resinous binder comprising a vinyl polymer containing hydroxy radical.

5. A material as in claim 1 where said photoconductive material is zinc oxide and said sensitizing dye is present in the amount of 0.02 parts per 100 parts of zinc oxide.

* * * * *